United States Patent
Fawcett (10) Patent No.: US 6,232,969 B1
(45) Date of Patent: May 15, 2001

(54) DEVICE FOR COMPOSING OR EDITING A STRING OF CHARACTERS

(75) Inventor: Glenn S. Fawcett, Vancouver (CA)

(73) Assignee: Glenayre Electronics, Inc., Charlotte, NC (US)

( * ) Notice: Subject to any disclaimer, the term of this patent is extended or adjusted under 35 U.S.C. 154(b) by 0 days.

(21) Appl. No.: 09/200,481

(22) Filed: Nov. 27, 1998

(51) Int. Cl.$^7$ ...................................................... G06F 3/00
(52) U.S. Cl. ............................................ 345/334; 345/141
(58) Field of Search .................................... 345/326, 333, 345/334, 339, 340, 169, 141, 25, 1; 340/825.44, 311.1

(56) References Cited

U.S. PATENT DOCUMENTS

| | | | | |
|---|---|---|---|---|
| 5,128,672 | * | 7/1992 | Kaehler | 341/23 |
| 5,430,436 | | 7/1995 | Fennell | 340/825.44 |
| 5,479,536 | * | 12/1995 | Comerford | 382/230 |
| 5,574,482 | * | 11/1996 | Niemeier | 345/173 |
| 5,748,512 | * | 5/1998 | Vargas | 708/142 |

* cited by examiner

Primary Examiner—Crescelle N. dela Torre
(74) Attorney, Agent, or Firm—Christensen O'Connor Johnson Kindness PLLC (57) ABSTRACT

A device for composing or editing a string of characters representing information, such as a text message, comprises a character string display for displaying a character string being composed or edited and a character selection display for displaying a set of characters for use in composing or editing the character string. The character selection display can be activated to display the character set in a display area in which at least some of the individual characters of the set are arranged relative to a designated location in the display area, such as the center of the display area, at distances according to decreasing frequency of use, e.g. a number of characters that are most likely to be frequently used are arranged in close proximity to the designated location. A cursor is displayed in the character selection display area and keys are provided for moving the cursor from one character to another in the character selection display for indicating a desired character to be selected. A key is provided for effecting selection of the desired character and the device automatically moves the cursor to the designated location after the selection of a desired character has been effected.

44 Claims, 6 Drawing Sheets

DEVICE FOR COMPOSING OR EDITING A STRING OF CHARACTERS

FIELD OF THE INVENTION

This invention relates to a device for composing or editing a string of characters representing information, such as for use in a device for wireless exchange of text messages.

BACKGROUND OF THE INVENTION

In a portable device for receiving and transmitting text messages, a problem arises when the device is pocket sized, since, due to its small size, it cannot conveniently accommodate both a multi-line display and a full alphabetic keyboard.

An attempt has been made to solve this problem by providing a display divided into two areas, being a message area, which shows a portion of the message being composed or edited, and a character selection area, which displays a list of characters for use in composing or editing the message. A set of keys is provided for moving a cursor within the selection area in order to select a required character which then appears in the message area. By moving the cursor from character to character, the user can compose a complete message. However, this method is tedious and slow. It is, accordingly, an object of the present invention to provide a method and an apparatus by which messages can be composed or edited, not only more effortlessly but also significantly faster.

SUMMARY OF THE INVENTION

According to the invention there is provided a device for composing or editing a string of characters representing information, comprising a character string display for displaying a character string being composed or edited; a character selection display for displaying a set of characters for use in composing or editing the character string; means for activating the character selection display to display the character set in a display area in which at least some of the individual characters of the set are arranged relative to a designated location in the display area at distances according to decreasing frequency of use; means for displaying a cursor in the character selection display area; means for moving the cursor from one character to another in the character selection display for indicating a desired character to be selected; means for effecting selection of said desired character; means for automatically moving the cursor to said designated location after the selection of a desired character has been effected.

A selected number of characters that are most likely to be frequently used may be arranged in close proximity to said designated location. The designated location may be occupied by a character having the highest frequency of use.

The device may further comprise a receiver for receiving a character string from a remote location and means for displaying said received string in the character string display. The device may also comprise a transmitter for sending a character string to a remote location. The character string may comprise a text message.

The display area may have a centre and the designated location may comprise the centre of the display area or it may be located in proximity to the centre.

Also according to the invention there is provided a device for composing or editing a string of characters representing information, comprising a character string display for displaying a character string being composed or edited; a character selection display for displaying a set of characters for use in composing or editing the character string; means for activating the character selection display to display the character set in a display area contained within a boundary; means for displaying a cursor in the character selection display area; means for moving the cursor within the character selection display area for selecting characters to be included in the character string being composed or edited; means for resisting attempted movement of the cursor over the boundary of the character selection display area; and means for switching the character selection display from one predetermined character set to another responsive to attempted movement of the cursor in a predetermined direction over said boundary.

Also according to the invention there is provided a device for composing or editing a string of characters representing information, comprising a character string display for displaying a character string being composed or edited; a character selection display for displaying a set of characters for use in composing or editing the character string; means for activating the character selection display to display the character set in a display area contained within a boundary; means for displaying a cursor in the character selection display area; means for moving the cursor within the character selection display area for selecting characters to be included in the character string being composed or edited; means for resisting attempted movement of the cursor over the boundary of the character selection display area; and means for automatically deleting a predetermined character in the character string responsive to attempted movement of the cursor in a predetermined direction over said boundary.

Also according to the invention there is provided a method of composing or editing a string of characters representing information, comprising the steps of activating a character selection display to display a set of characters for use in composing or editing the character string in a display area in which the individual characters of the set are arranged relative to a designated location in the display area at distances according to decreasing frequency of use; displaying a cursor in the display area; moving the cursor to a desired character; activating a selector for selecting the desired character indicated by the cursor for including the desired character in the character string being composed or edited; and effecting an automatic movement of the cursor to said designated location substantially immediately after the selection of the desired character.

Also according to the invention there is provided a method of composing or editing a string of characters representing information, comprising the steps of activating a character selection display to display a set of characters for use in composing or editing the character string in a display area contained within a boundary; displaying a cursor in the display area for selecting characters from the character set to be included in the character string being composed or edited; resisting attempted movement of the cursor over the boundary of the character selection display area; and effecting an automatic switching of the character selection display from one predetermined character set to another responsive to attempted movement of the cursor in a predetermined direction over said boundary.

Also according to the invention there is provided a method of composing or editing a string of characters representing information, comprising the steps of activating a character selection display to display a set of characters for use in composing or editing the character string in a display area contained within a boundary; displaying a cursor in the display area for selecting characters from the character set to be included in the character string being composed or edited; resisting attempted movement of the cursor over the boundary of the character selection display area; and effecting an automatic deletion of a predetermined character in the character string responsive to attempted movement of the cursor in a predetermined direction over said boundary.

Further objects and advantages of the invention will become apparent from the description of preferred embodiments of the invention below.

BRIEF DESCRIPTION OF THE DRAWINGS

The invention will now be described, by way of examples, with reference to the accompanying drawings, in which.

DETAILED DESCRIPTION OF PREFERRED EMBODIMENTS

Figure 1:
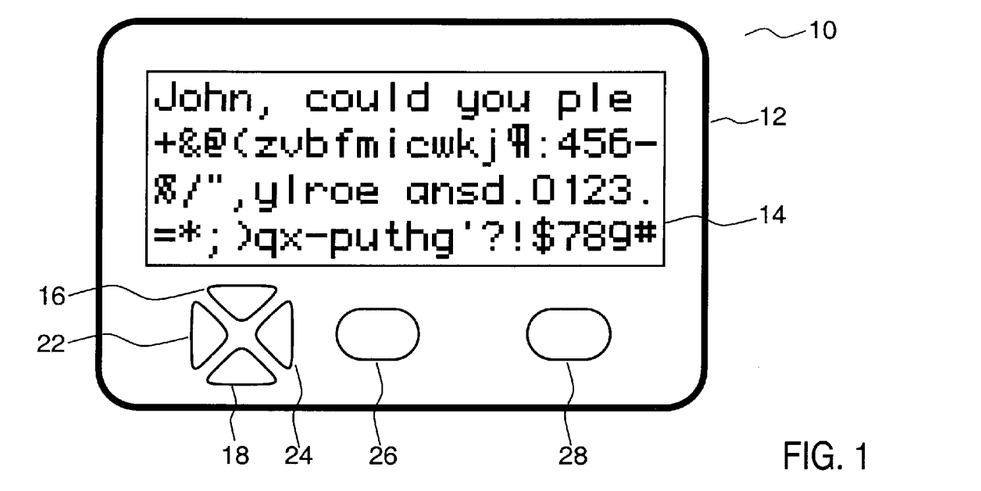
FIG. 1 is a plan view of a pocket-sized text message transmitter and receiver of FIG. 1.

In FIG. 1 reference 10 generally indicates a portable device for wirelessly transmitting and receiving text messages. The device 10 comprises a casing 12 housing a battery, a transmitter 38, a receiver 42 and a microprocessor 30. Conveniently, the device 10 is about the size of a credit card with a thickness of about three-quarters of an inch, or less.

The device 10 is provided with a display area which comprises a liquid crystal display (LCD) 14 which is controlled by the microprocessor 30. As shown in the present example, the display 14 is a four line by 20 column display. The display 14 shows letters and numbers, as well as other characters and punctuation marks. In addition, the display 14 also shows a cursor (not shown), which specifies a single character by highlighting or other means.

The device 10 further includes a set of six user activated keys, being an "Up" key 16, a "Down" key 18, a "Left" key 22, a "Right" key 24, a "Select" key 26 and an "Exit" key 28. Touch or force sensors may be provided instead of the keys.

Figure 2:
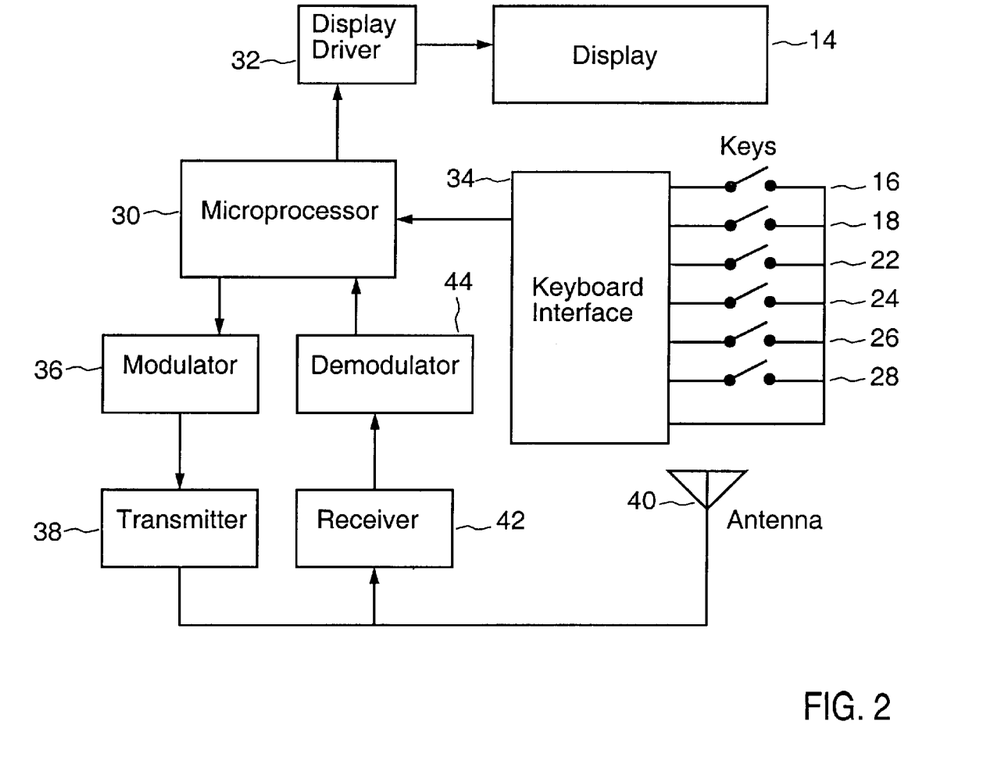
FIG. 2 is a block diagram of the message transmitter and receiver.

As shown in FIG. 2, the microprocessor 30 connects to a display driver 32 to control the display 14, visible to the user. The microprocessor 30 also connects to keyboard interface circuitry 34 that detects when the user activates one of the keys 16, 18, 22, 24, 26 or 28. Messages may be received from an antenna 40 connected to the receiver 42 and demodulated to data by demodulator 44 before being stored in the memory of the microprocessor 30 for later viewing by the user on the display 14. After the user composes a message for transmission, the microprocessor 30 will cause the message to be modulated by modulator 36 connected to the transmitter 38 for broadcast using the antenna 40. In some embodiments, a separate antenna may be connected to the transmitter 38 and receiver 42. In other embodiments, the transmitter and receiver may use infrared light, eliminating the need for an antenna.

The device 10 is switchable between different modes of operation. One such mode is a message editing or composing mode, as shown in FIGS. 1, 3 and 4 and 6 and 7, in which the device 10 displays a portion of the message as a single line at the top of the display 14, as indicated by the block 62, and a character selection area comprising the lower three lines of the display. The character selection area comprises an alphabetic selection area, indicated by the block 64, and a numeric selection area, indicated by the block 66.

As their names indicate, the keys 16, 18, 22 and 24 are used to move the cursor within the selection areas for the purpose of selecting required characters.

Figure 3:
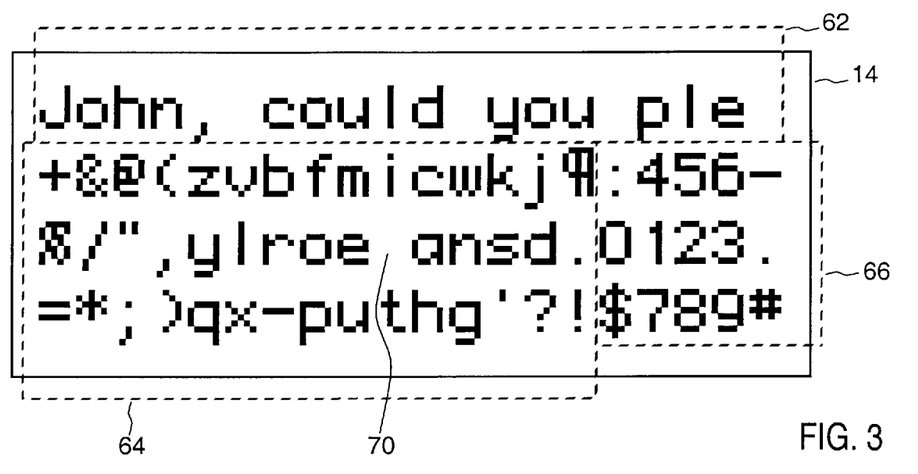
FIG. 3 shows the display area of the device of FIG. 1 in a lower case display state when editing a message.
Figure 4:
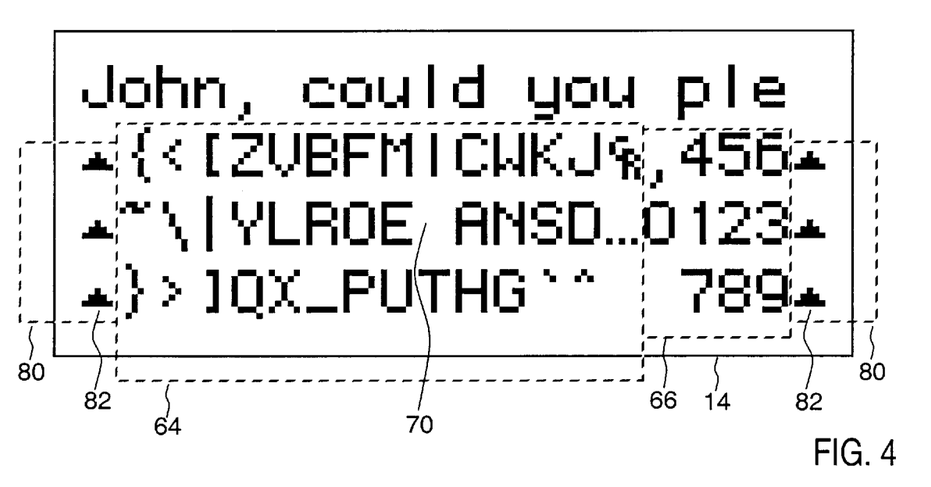
FIG. 4 shows the display area of the device of FIG. 1 in an upper case display state when editing a message.

As shown, the alphabetic selection area 64 contains a space character 70 in approximately the centre thereof.

A character in the character selection area is selected by moving the cursor to the character, by means of the keys 16, 18, 20 and 22 and then depressing the select key 26. The operation of the device 10 is such that, after a character has been selected from the alphabetic selection area 64 by depressing the select key 26, the cursor is immediately and automatically returned to the space character 70 in the centre of the alphabetic selection area 64.

It has been determined that in typical English messages, the most frequently used characters, in order of frequency, are the space character 70 and then "e", "t", "a", "i", "o" and "n". As shown in FIGS. 3 and 4, the alphabetic selection area 64 is organized so that these characters are the closest to the space character 70, i.e. they are arranged closest to the centre position of the alphabetic selection area 64. Thus, the least amount of cursor movement is required to select the most frequently used characters.

It will be appreciated that the frequency of use will differ with different languages and the arrangement of the characters can be adapted accordingly.

In the preferred embodiment, the alphabetic selection area 64 also contains a few special symbols, i.e. "¶" for inserting two carriage returns, "$C_R$" for inserting a single carriage return, and " . . . " for inserting three periods.

The device 10 can be switched (FIG. 5) in rotation fashion between lower case state 90 (FIG. 3), upper case state 92 and upper case lock state 94 (FIG. 4). This is achieved by locating the cursor in the top line of either the alphabetic selection area 64 or the numeric selection area 66 and depressing the "Up" key 16.

When in the upper case or locked upper case states, the alphabetic selection area 64 and the numeric selection area 66 are each provided with a shift lock indicator area 80. When in the upper case state, the area 80 contains blanks and when in the upper case lock state, it contains arrows 82, as shown in FIG. 4.

A character in the message line can be deleted by positioning the cursor in the bottom line of either the alphabetic selection area 64 or the numeric selection area 66 and pressing the "Down" key 18. This results in the last character which was inserted into the message line being deleted. This operation may be repeated to delete multiple characters.

Figure 6:
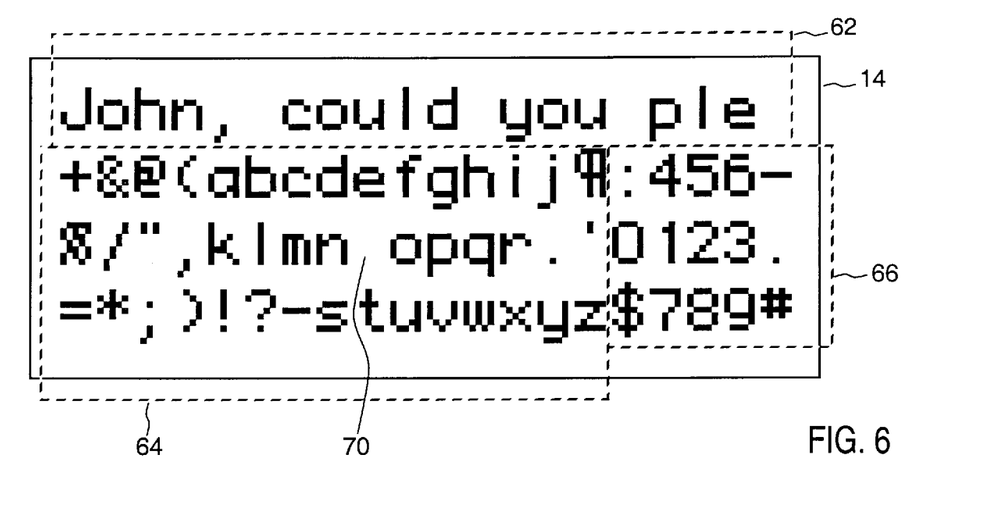
FIG. 6 shows the display area of the device of FIG. 1, with an alternative arrangement of the characters, in a lower case display state when editing a message.
Figure 7:
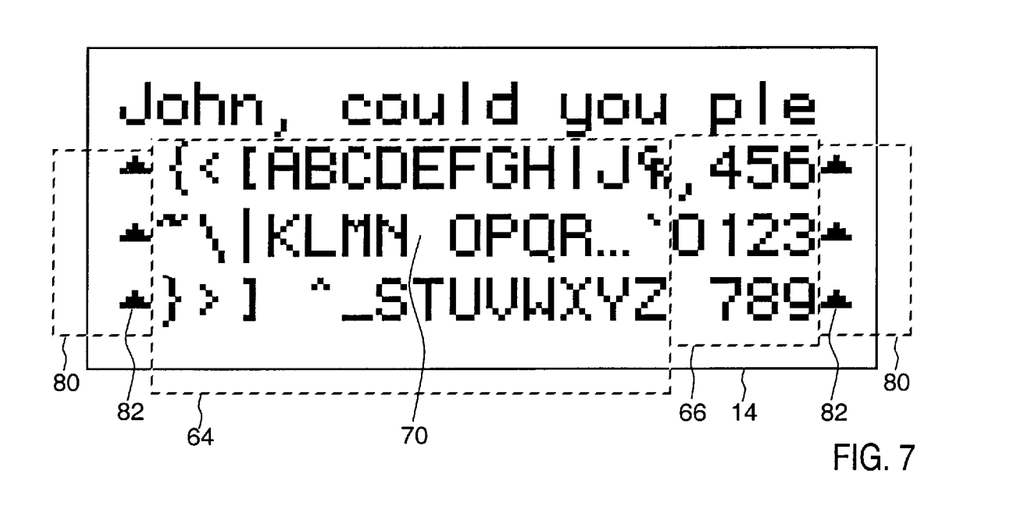
FIG. 7 shows the display area of the device of FIG. 1, with an alternative arrangement of the characters, in an upper case state when editing a message.

The device 10 can also be switched to an alternative arrangement of the alphabetic selection area 64. This arrangement, as shown in FIGS. 6 and 7, is easier for novice users because it retains an alphabetic order. However, the characters are still arranged so that the space character 70 is at the centre and surrounded by the characters likely to be most frequently entered, such as "e", "t", "o" and "n".

When a selection is made from the numerical selection area 66 (as shown in FIGS. 3, 4, 6 or 7) the cursor is not automatically moved but remains in the position selected last.

When composing or editing of a message has been completed, the user exits the text editing mode by pressing the "Exit" key 28.

The device may have various different modes of operation that are, in general, beyond the scope of the invention, since similar modes are known in other messaging devices. These modes are briefly summarized below.

The preferred embodiment will have a "Main Menu" mode in which a variety of other operational modes may be selected. Some examples include "View Received Messages", "Send Message", and "Change Preferences".

The "View Received Messages" mode displays a list of messages that have previously been received. Selecting a message results in entry of a "Display Message" mode in which the user can view the entire message, scrolling up and down if the message is larger than the display. Options are provided for deleting or replying to a message.

The "Send Message" mode provides a list of previously-sent messages that may be edited and resent and provides the option of creating a new message. When a previously-sent message is selected, the device enters a "Positioning" mode in which the message is displayed and a cursor can be moved within the message to indicate where the insertion point is to be located. Pressing the "Select" key then enters the "Message Editing" mode, which is the focus of the present invention. Creating a new message also immediately enters this mode.

Figure 5:
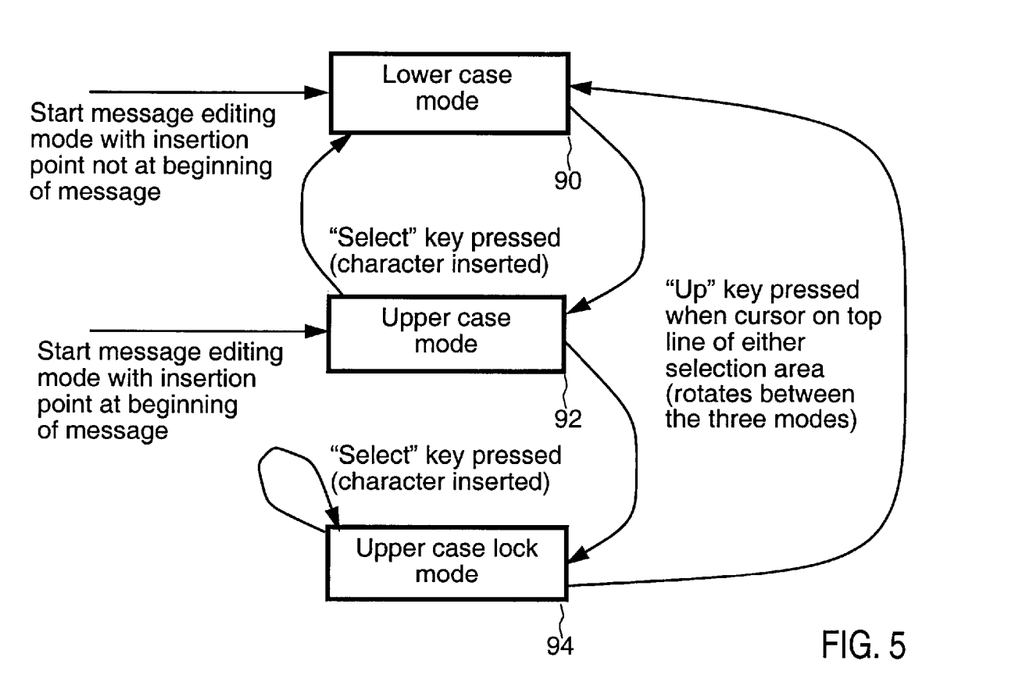
FIG. 5 is a state diagram illustrating the method of switching between the upper and lower case display states when editing a message.

In the preferred embodiment, if the "Message Editing" mode is entered and the insertion point is at the beginning of a message, the "upper case" state 92 is entered, as shown in FIG. 5.

Otherwise, the "lower case" state 90 is entered. This provides a convenience to the user because the first character of most messages is capitalized.

The "Exit" key, in general, returns to the previous mode. Thus pressing the key when in "Message Editing" mode returns to the "Positioning" mode.

Selecting "Change Preferences" from the main menu allows parameters of the device that relate to the user interface to be altered. For example, the user could adjust the display contrast, alert tones, etc. In a specific application of the present invention, the user may chose between alternative arrangements of the alphabetic selection area 64 when in "Message Editing" mode, as shown in FIGS. 3 and 4 vs. FIGS. 6 and 7.

Figure 8A:
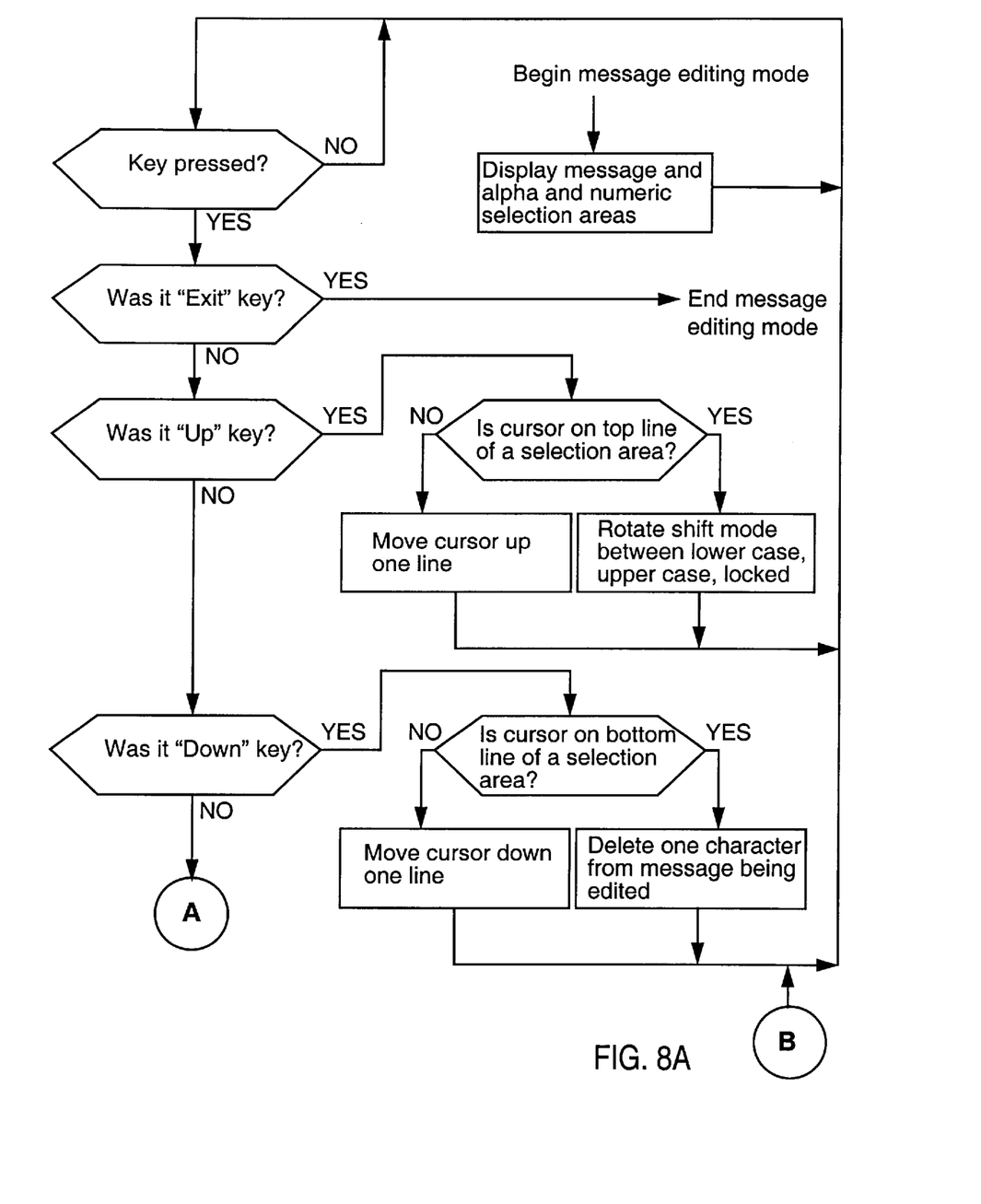
FIGS. 8A and 8B are flow charts illustrating the method of operation of the device of FIG. 1 when editing a message.
Figure 8B:
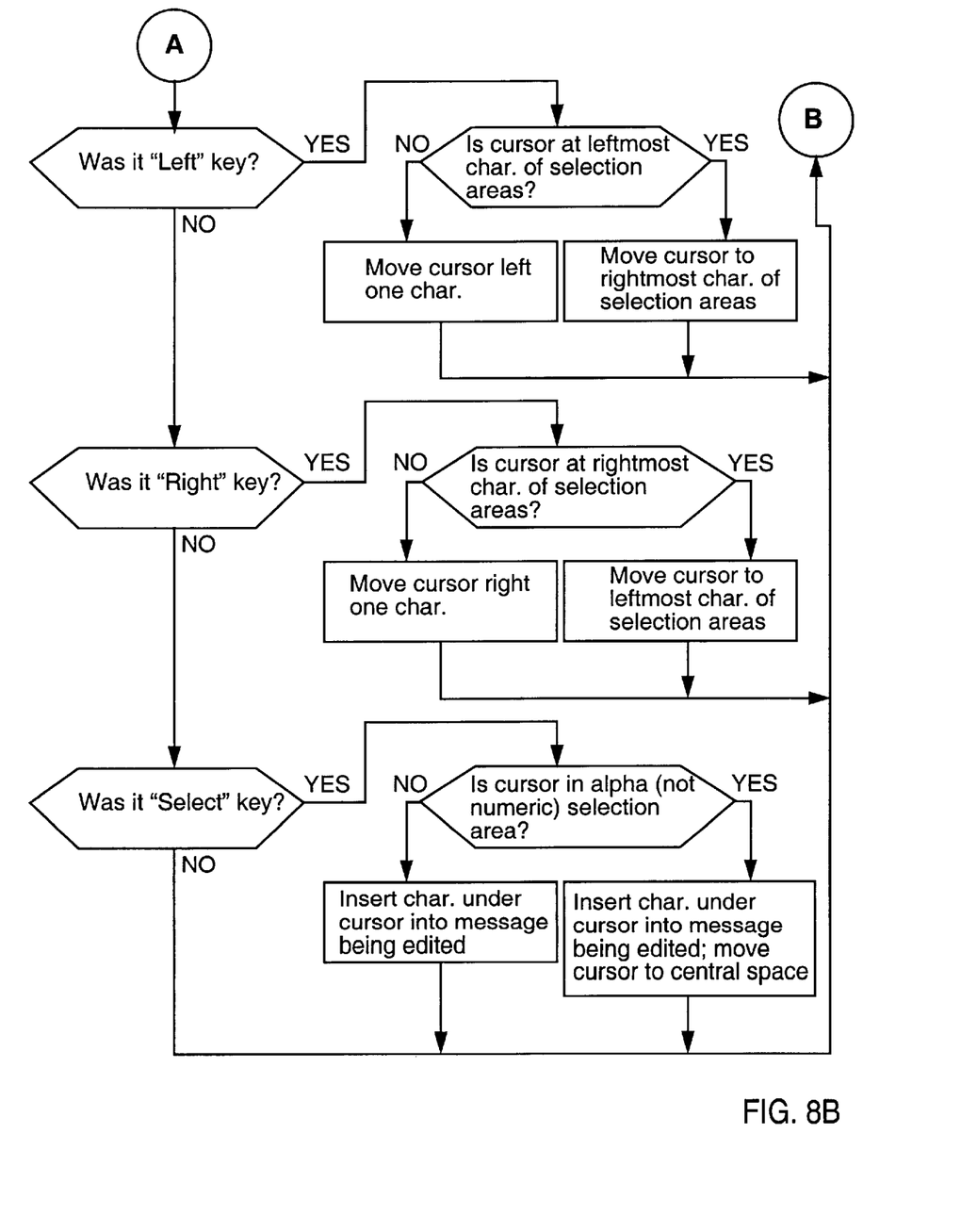

The operation of the device 10 is controlled by the microprocessor 30 and the method of operation is shown in FIGS. 8A and B.

While only preferred embodiments of the invention have been described herein in detail, the invention is not limited thereby and modifications can be made within the scope of the attached claims.

What is claimed is:

1. A device for composing or editing a string of characters representing information, comprising:

a character string display for displaying a character string being composed or edited;

a character selection display for displaying a set of characters for use in composing or editing the character string;

a microprocessor for activating the character selection display to display the character set in a display area in which at least some of the individual characters of the set are arranged relative to a designated location in the display area at distances according to decreasing frequency of use, the designated location being centrally located in the display area such that characters may be arranged on opposite sides of the designated location;

the microprocessor displaying a cursor in the character selection display area;

an interface for moving the cursor from one character to another in the character selection display for indicating a desired character to be selected;

the microprocessor effecting selection of said desired character;

the microprocessor automatically moving the cursor to said designated location after the selection of a desired character has been effected.

2. The device according to claim 1, wherein a selected number of characters that are most likely to be frequently used are arranged in close proximity to said designated location.

3. The device according to claim 1, wherein said designated location is occupied by a character having the highest frequency of use.

4. The device according to claim 3, wherein said character having the highest frequency of use is the space character.

5. The device according to claim 1, wherein the character set comprises the letters of the alphabet and the letters "e", "t", "a", "i", "o" and "n" are arranged in proximity to said designated location.

6. The device according to claim 1, wherein the character string comprises a text message.

7. The device according to claim 1, further comprising a receiver for receiving a character string from a remote location and means for displaying said received string in the character string display.

8. The device according to claim 1, further comprising a transmitter for sending a character string to a remote location.

9. The device according to claim 1, wherein said display area is contained within a boundary and further comprising:

means for resisting attempted movement of the cursor over the boundary; and means for switching the character selection display from one predetermined character set to another responsive to attempted movement of the cursor in a predetermined direction over said boundary.

10. The device according to claim 9, wherein the one character set comprises the letters of the alphabet being in upper case and the other comprises the letters being in lower case.

11. The device according to claim 1, further comprising:

means for generating different character sets for display in the character selection display; and means for selecting between said different character sets for displaying a selected one of said character sets in the character selection display.

12. The device according to claim 1, wherein said display area is contained within a boundary and further comprising:

means for resisting attempted movement of the cursor over the boundary; and means for automatically deleting a predetermined character in the character string display responsive to attempted movement of the cursor in a predetermined direction over said boundary.

13. The device according to claim 12, wherein said predetermined character is the last character in the string.

14. The device according to claim 1, wherein said display area has a centre and said designated location comprises the centre of the display area.

15. The device according to claim 1, wherein said display area has a centre and said designated location is located in proximity to the centre.

16. A device for composing or editing a string of characters representing information, comprising:

a character string display for displaying a character string being composed or edited;

a character selection display for displaying a set of characters for use in composing or editing the character string;

means for activating the character selection display to display the character set in a display area contained within a boundary;

means for displaying a cursor in the character selection display area;

means for moving the cursor within the character selection display area for selecting characters to be included in the character string being composed or edited;

means for resisting attempted movement of the cursor over the boundary of the character selection display area; and means for switching the character selection display from one predetermined character set to another responsive to attempted movement of the cursor in a predetermined direction over said boundary.

17. The device according to claim 16, wherein the one character set comprises the letters of the alphabet being in upper case and the other comprises the letters being in lower case.

18. A device for composing or editing a string of characters representing information, comprising:

a character string display for displaying a character string being composed or edited;

a character selection display for displaying a set of characters for use in composing or editing the character string;

means for activating the character selection display to display the character set in a display area contained within a boundary;

means for displaying a cursor in the character selection display area;

means for moving the cursor within the character selection display area for selecting characters to be included in the character string being composed or edited;

means for resisting attempted movement of the cursor over the boundary of the character selection display area; and means for automatically deleting a predetermined character in the character string responsive to attempted movement of the cursor in a predetermined direction over said boundary.

19. The device according to claim 18, wherein said predetermined character is the last character in the string.

20. A method of composing or editing a string of characters representing information comprising the steps of:

activating a character selection display to display a set of characters for use in composing or editing the character string in a display area in which at least some of the individual characters of the set are arranged relative to a designated location in the display area at distances according to decreasing frequency of use, the designated location being centrally located in the display area such that characters may be arranged on opposite sides of the designated location;

displaying a cursor in the display area;

moving the cursor to a desired character;

activating a selector for selecting the desired character indicated by the cursor for including the desired character in the character string being composed or edited; and effecting an automatic movement of the cursor to said designated location substantially immediately after the selection of the desired character.

21. The method according to claim 20, wherein a selected number of characters that are most likely to be frequently used are arranged in close proximity to said designated location.

22. The method according to claim 20, further comprising the step of locating a character having the highest frequency of use in said designated location.

23. The method according to claim 22, wherein the space character is located in said designated location.

24. The method according to claim 20, wherein the character set comprises the letters of the alphabet and the letters "e", "t", "a", "I", "o" and "n" are arranged in proximity to said designated location.

25. The method according to claim 20, wherein the character string comprises a text message.

26. The method according to claim 20, wherein the display area is contained within a boundary and further comprising the steps of:

resisting attempted movement of the cursor over the boundary; and effecting an automatic switching of the character selection display from one predetermined character set to another responsive to attempted movement of the cursor in a predetermined direction over said boundary.

27. The method according to claim 26, wherein the one character set comprises the letters of the alphabet in upper case and the other comprises the letters in lower case.

28. The method according to claim 20, wherein the display area is contained within a boundary and further comprising sets of:

resisting attempted movement of the cursor over the boundary; and effecting an automatic deletion of a predetermined character in the character string responsive to attempted movement of the cursor in a predetermined direction over said boundary.

29. The method according to claim 28 wherein the character being deleted is the last character in the string.

30. The method according to claim 20, wherein the display area has a centre and said designated location comprises the centre of the display area.

31. The method according to claim 20, wherein the display area has a centre and said designated location is located in proximity to the centre.

32. A method of composing or editing a string of characters representing information, comprising the steps of:

activating a character selection display to display a set of characters for use in composing or editing the character string in a display area contained within a boundary;

displaying a cursor in the display area for selecting characters from the character set to be included in the character string being composed or edited;

resisting attempted movement of the cursor over the boundary of the character selection display area; and effecting an automatic switching of the character selection display from one predetermined character set to another responsive to attempted movement of the cursor in a predetermined direction over said boundary.

33. The method according to claim 32 wherein the one character set comprises the letters of the alphabet in upper case and the other comprises the letters in lower case.

34. A method of composing or editing a string of characters representing information, comprising the steps of:

activating a character selection display to display a set of characters for use in composing or editing the character string in a display area contained within a boundary;

displaying a cursor in the display area for selecting characters from the character set to be included in the character string being composed or edited;

resisting attempted movement of the cursor over the boundary of the character selection display area; and effecting an automatic deletion of a predetermined character in the character string responsive to attempted movement of the cursor in a predetermined direction over said boundary.

35. The method according to claim 34, wherein said predetermined character is the last character in the string.

36. A device for composing or editing a string of characters representing information, comprising:

a character string display for displaying a character string being composed or edited;

a character selection display for displaying a set of characters for use in composing or editing the character string;

a microprocessor for activating the character selection display to display the character set in a display area contained within a boundary;

the microprocessor displaying a cursor in the character selection display area;

an interface for moving the cursor within the character selection display area for selecting characters to be included in the character string being composed or edited;

the microprocessor resisting attempted movement of the cursor over the boundary of the character selection display area; and the microprocessor switching the character selection display from one predetermined character set to another responsive to attempted movement of the cursor in a predetermined direction over said boundary.

37. The device according to claim 36, wherein the one predetermined character set comprises the letters of the alphabet being in upper case and the other comprises the letters being in lower case.

38. A device for composing or editing a string of characters representing information, comprising:

a character string display for displaying a character string being composed or edited;

a character selection display for displaying a set of characters for use in composing or editing the character string;

a microprocessor for activating the character selection display to display the character set in a display area contained within a boundary;

the microprocessor displaying a cursor in the character selection display area;

an interface for moving the cursor within the character selection display area for selecting characters to be included in the character string being composed or edited;

the microprocessor resisting attempted movement of the cursor over the boundary of the character selection display area; and the microprocessor automatically deleting a predetermined character in the character string responsive to attempted movement of the cursor in a predetermined direction over said boundary.

39. The device according to claim 38, wherein said predetermined character is the last character in the string.

40. A device for composing a string of characters representing information, comprising:

a character string display for displaying a character string being composed;

a character selection display for displaying a set of characters for use in composing the character string;

a microprocessor for activating the character selection display to display the character set in a display area contained within a boundary;

the microprocessor displaying a cursor in the character selection display area;

an interface for moving the cursor within the character selection display area for selecting characters to be included in the character string being composed;

the microprocessor resisting attempted movement of the cursor over the boundary of the character selection display area; and the microprocessor performing a designated editing function responsive to attempted movement of the cursor in a predetermined direction over said boundary.

41. The device according to claim 40, wherein the designated editing function alters characters in the character selection display.

42. The device according to claim 41, wherein the designated editing function switches the character selection display from one predetermined character set to another.

43. The device according to claim 40, wherein the designated editing function edits characters in the character string display.

44. The device according to claim 43, wherein the designated editing function automatically deletes a character in the character string.

* * * * *